US008765092B2

(12) United States Patent
Qi et al.

(10) Patent No.: US 8,765,092 B2
(45) Date of Patent: Jul. 1, 2014

(54) NON-STOICHIOMETRIC PEROVSKITE OXIDE OXIDATION CATALYST FOR OXIDIZING NO TO $NO_2$

(75) Inventors: Gongshin Qi, Troy, MI (US); Wei Li, Troy, MI (US); Xinquan Wang, Tianjin (CN); Meiqing Shen, Nankai District (CN)

(73) Assignees: GM Global Technology Operations LLC, Detroit, MI (US); Tianjin University, Tianjin (CN)

( * ) Notice: Subject to any disclaimer, the term of this patent is extended or adjusted under 35 U.S.C. 154(b) by 173 days.

(21) Appl. No.: 13/481,247

(22) Filed: May 25, 2012

(65) Prior Publication Data

US 2012/0304624 A1 Dec. 6, 2012

(30) Foreign Application Priority Data

Jun. 3, 2011 (CN) .......................... 2011 1 0166967

(51) Int. Cl.

| | |
|---|---|
| ***B01D 53/56*** | (2006.01) |
| ***B01D 53/94*** | (2006.01) |
| ***B01J 23/10*** | (2006.01) |
| ***B01J 23/34*** | (2006.01) |
| ***C01B 21/36*** | (2006.01) |
| ***F01N 3/28*** | (2006.01) |

(52) U.S. Cl.

USPC ..... 423/400; 423/402; 423/213.2; 423/213.5; 423/213.7; 423/239.1; 60/274; 60/299; 60/301; 502/303; 502/324; 502/525

(58) Field of Classification Search

USPC ................ 423/400, 402, 213.2, 213.5, 213.7, 423/239.1; 60/274, 299, 301; 502/303, 324, 502/525

See application file for complete search history.

(56) References Cited

U.S. PATENT DOCUMENTS

| | | | | |
|---|---|---|---|---|
| 6,060,420 | A * | 5/2000 | Munakata et al. | 502/302 |
| 7,964,167 | B2 * | 6/2011 | Kim et al. | 423/213.2 |
| 8,057,767 | B1 | 11/2011 | Qi et al. | |
| 8,226,915 | B2 | 7/2012 | Qi et al. | |
| 8,268,274 | B2 | 9/2012 | Kim et al. | |
| 8,377,400 | B2 * | 2/2013 | Schmieg et al. | 423/213.2 |
| 8,513,155 | B2 * | 8/2013 | Li et al. | 502/333 |
| 8,545,779 | B2 * | 10/2013 | Blint et al. | 423/213.2 |
| 2010/0086458 | A1 * | 4/2010 | Kim et al. | 423/239.1 |
| 2010/0229533 | A1 | 9/2010 | Li et al. | |
| 2010/0233045 | A1 | 9/2010 | Kim et al. | |
| 2011/0076212 | A1 | 3/2011 | Schmieg et al. | |
| 2011/0082030 | A1 | 4/2011 | Kim et al. | |
| 2012/0042631 | A1 | 2/2012 | Schmieg et al. | |
| 2012/0047874 | A1 | 3/2012 | Schmieg et al. | |
| 2012/0060472 | A1 | 3/2012 | Li et al. | |
| 2012/0079813 | A1 | 4/2012 | Sloane et al. | |
| 2012/0157301 | A1 | 6/2012 | Qi et al. | |
| 2012/0159927 | A1 | 6/2012 | Li et al. | |
| 2012/0159935 | A1 | 6/2012 | Li et al. | |
| 2012/0180453 | A1 | 7/2012 | Blint et al. | |
| 2012/0183467 | A1 | 7/2012 | Qi et al. | |
| 2012/0240554 | A1 | 9/2012 | Qi et al. | |
| 2012/0291420 | A1 | 11/2012 | Kim et al. | |
| 2013/0111876 | A1 * | 5/2013 | Qi et al. | 60/274 |

OTHER PUBLICATIONS

Qi et al., "Low Cost Lean NOx Reduction Catalyst System," U.S. Appl. No. 13/288,215, filed Nov. 3, 2011.

Parvaneh Esmaeilnejad-Ahranjani et al.; Effects of excess manganese in lanthanum manganite perovskite on lowering oxidation light-off temperature for automotive exhaust gas pollutants; Chemical Engineering Journal 169 (2011) 282-289.

* cited by examiner

*Primary Examiner* — Timothy Vanoy

(74) *Attorney, Agent, or Firm* — Reising Ethington P.C.

(57) ABSTRACT

A non-stoichiometric perovskite oxide having the general chemical formula $La_XMnO_Y$, in which the molar ratio of lanthanum to manganese ("X") ranges from 0.85 to 0.95, can be used in particle form as an oxidation catalyst to oxidize NO to $NO_2$ in an exhaust aftertreatment system for a hydrocarbon-fueled engine. The oxygen content ("Y") fluctuates with variations in the molar ratio of lanthanum to manganese but generally falls somewhere in the range of 3.0 to 3.30. The crystal lattice adjustments spurred by the non-stoichiometric molar ratio of lanthanum to manganese are believed responsible for an enhanced NO oxidative activity relative to similar perovskite oxides with a higher molar ratio of lanthanum and manganese.

18 Claims, 6 Drawing Sheets

NON-STOICHIOMETRIC PEROVSKITE OXIDE OXIDATION CATALYST FOR OXIDIZING NO TO $NO_2$

REFERENCE TO RELATED APPLICATIONS

This application claims priority from Chinese Patent Application No. CN 201110166967.3 filed Jun. 3, 2011, the entire contents of which are hereby incorporated by reference into this application.

TECHNICAL FIELD

The technical field of this disclosure relates generally to oxidation catalysts that can be used in particle form to oxidize NO to $NO_2$ in an exhaust aftertreatment system installed, for example, in a vehicle and, more specifically, to a non-stoichiometric perovskite oxide that includes lanthanum and manganese in a non-stoichiometric molar ratio.

BACKGROUND

A hydrocarbon-fueled engine such as, for example, an internal combustion engine for a vehicle, may combust a mixture of air and fuel to drive mechanical equipment and perform work. The hot exhaust gas generated by the engine generally contains unwanted gaseous emissions and possibly some suspended particulate matter that may need to be converted to more innocuous substances before being discharged to the atmosphere. The gaseous emissions primarily targeted for abatement include carbon monoxide, unburned and partially burned hydrocarbons (HC's), and nitrogen oxide compounds ($NO_X$) comprised of NO and $NO_2$ along with nominal amounts of $N_2O$. An exhaust aftertreatment system that includes specially catalyzed flow-through components may be employed to dynamically treat a continuous exhaust flow with variable concentrations of these emissions. Many different exhaust aftertreatment system designs have been developed. But in general these systems seek to oxidize both carbon monoxide and HC's (to carbon dioxide and water) and reduce $NO_X$ (to nitrogen and water). Suspended particulate matter, if present, is usually captured by a filter and burned off at regular intervals.

The catalytic conversion efficiency of carbon monoxide, HC's, and $NO_X$ over various types of catalysts depends largely on the air to fuel mass ratio of the mixture of air and fuel fed to the engine. A stoichiometric mixture of air and fuel (air to fuel mass ratio of about 14.7 for standard petrol-based gasoline) combusts to provide the exhaust flow with a reaction balance of oxidants ($O_2$ and $NO_X$) and reductants (CO, HC's, and $H_2$). This type of exhaust flow composition is generally the easiest to treat. A conventional three-way-catalyst (TWC) that includes a platinum group metal mixture dispersed on a base metal oxide support material, and which is close-coupled to the engine, can simultaneously reduce $NO_X$ and oxidize carbon monoxide and HC's through various coupled catalytic reactions. But a stoichiometric mixture of air and fuel is not always maintained or even practical (i.e., a diesel engine). The engine may, for instance, combust a lean mixture of air and fuel (air to fuel mass ratio above 14.7 for standard petrol-based gasoline) to achieve more efficient fuel economy. The excess air contained in a lean mixture of air and fuel increases the concentration of uncombusted oxygen and decreases the concentrations of the various reductants in the exhaust flow. The catalytic reduction rate of $NO_X$ to $N_2$ is slowed in such an oxidative environment over a conventional TWC and may require an entirely different system design or supplemental $NO_X$ treatment capacity to bring $NO_X$ concentrations within acceptable levels.

The two most prevalent approaches, to date, for reducing $NO_X$ in an oxygen enriched exhaust flow are a selective catalytic reduction (SCR) system and a lean $NO_X$ trap (LNT). A SCR system introduces a reductant such as ammonia (or urea because it reacts to form ammonia) or a hydrocarbon into the exhaust flow which, in turn, reacts with $NO_X$ in the presence of oxygen over a reaction-specific SCR catalyst to form nitrogen. A LNT directs the exhaust flow over a $NO_X$ absorption catalyst that stores $NO_2$ as a nitrate species until purged with a source of reductants that also converts the desorbed $NO_X$ into nitrogen over a $NO_X$ reduction catalyst. The overall $NO_X$ conversion efficiency for both practices can be enhanced by decreasing the molar ratio of NO to $NO_2$ in the $NO_X$ gas constituency originally produced by the engine. A preferred NO:$NO_2$ molar ratio for rapid $NO_X$ reduction in the SCR system is approximately 1.0 (equimolar). A preferred ratio of NO:$NO_2$ for the LNT is much less. Most, if not all, of the NO present in the exhaust flow is preferably oxidized to $NO_2$ to maximize the $NO_2$ absorption selectivity of the $NO_X$ absorption catalyst.

The $NO_X$ generated by the engine during combustion of a lean mixture of air and fuel generally constitutes greater than 90 mol % NO and less than 10 mol % $NO_2$. An oxidation catalyst that can selectively oxidize NO to $NO_2$ may be provided upstream of the SCR catalyst or the $NO_X$ absorption catalyst and, if desired, in close proximity to the hydrocarbon-fueled engine. The oxidation catalyst may be part of a diesel oxidation catalyst (DOC) or some other suitable two-way catalyst composition. The upstream oxidation catalyst oxidizes NO (to $NO_2$) to achieve a more desirable NO:$NO_2$ molar ratio and, additionally, may oxidize CO and HC's to some extent. The lower NO:$NO_2$ molar ratio boosts $NO_X$ reduction activity in the SCR system or the LNT and, in turn, enhances the overall $NO_X$ conversion efficiency of the exhaust aftertreatment system. The oxidation catalyst may also be intermingled within the SCR catalyst or the $NO_X$ absorption and/or reduction catalysts to further oxidize NO that may slip past the upstream oxidation catalyst to ensure near-complete conversion of $NO_X$ to $N_2$. Other oxidation catalysts that are more selective towards CO and HC's may be combined with the oxidation catalyst that affects NO to form a multi-functional catalyst material.

The oxidation catalyst that has conventionally been used in an exhaust aftertreatment system to oxidize NO to $NO_2$ is fine particles of platinum or a platinum-based metal alloy. But platinum and platinum-based alloys are rather expensive and tend to suffer from poor thermal durability. A better-performing, lower-cost, and more durable oxidation catalyst that exhibits a useful NO to $NO_2$ oxidative activity would be a valuable contribution to those interested in $NO_X$ treatment because it could serve as partial or total substitute for platinum and platinum-based alloys in an exhaust aftertreatment system.

SUMMARY OF THE DISCLOSURE

An exhaust flow produced by a hydrocarbon-fueled engine may be exposed to immobilized fine particles of a non-stoichiometric perovskite oxide as part of an exhaust aftertreatment system. The particles of the non-stoichiometric perovskite oxide may be sized to have a diameter that ranges from about 10 nm to about 100 μm. Intimate contact between the exhaust flow and the non-stoichiometric perovskite oxide particles oxidizes NO to $NO_2$ and, as such, decreases the NO:$NO_2$ molar ratio of the exhaust flow's $NO_X$ content to a more desirable level. The non-stoichiometric perovskite oxide has the general formula $La_XMnO_Y$ in which the molar ratio of lanthanum to manganese, which is represented as "X" in the chemical formula, ranges from 0.85 to 0.95 (sometimes referred to as "$La_{0.85-0.95}MnO_Y$"). The oxygen content, which is represented as "Y" in the chemical formula, fluctuates with variations in the molar ratio of lanthanum to manganese but generally falls somewhere between 3.0 and 3.30.

This particular class of non-stoichiometric perovskite oxide particles (La:Mn molar ratio of 0.85 to 0.95) has a demonstrated NO oxidative activity that, in terms of NO to $NO_2$ conversion and hydrothermal durability over the temperature range typically experienced in an exhaust aftertreatment system, is superior to the NO oxidative activity of similar perovskite oxide particles with a higher molar ratio of lanthanum to manganese. The enhanced NO oxidative activity of the $La_{0.85-0.95}MnO_Y$ perovskite oxide particles is thought to be attributed to crystal lattice adjustments that are spurred by the decrease in the molar ratio of lanthanum to manganese away from stoichiometry. For instance, an increase in both the surface and bulk concentrations of $Mn^{4+}$, as well as an increase in the available amount active oxygen, has generally been observed with decreasing values of the molar ratio of lanthanum to manganese. Setting the molar ratio of lanthanum to manganese ("X") between 0.85 and 0.95 in the non-stoichiometric perovskite oxide particles appears to coincide with a desirable balance of the $Mn^{4+}/Mn^{3+}$ atomic ratio, active oxygen availability, surface area, and thermal durability, all of which contribute to NO oxidative activity.

The hydrocarbon-fueled engine that produces the exhaust flow may be a multi-cylinder, reciprocating, internal combustion engine that is supplied with a mixture of air and fuel ("A/F mixture") defined by an air to fuel mass ratio in known controlled fashion. The air to fuel mass ratio of the A/F mixture may be lean of stoichiometry either some of the time or all of the time. A lean A/F mixture, when combusted in the engine, typically affords the exhaust flow with a relatively high oxygen content in the range of 1.0 to 10 vol. %, a $NO_X$ content of 50 ppmv to1500 ppmv, a partially burned or unburned hydrocarbon content of 250 ppmv to 750 ppmv, a CO content of 50 ppmv to 500 ppmv, maybe some suspended particulate matter, and the balance nitrogen, water, and carbon dioxide. The $NO_X$ content is usually comprised of greater than 90 mol % NO and less than 10 mol % $NO_2$, which corresponds to a NO:$NO_2$ molar ratio of about 9 or greater.

The exhaust flow may be exposed to the immobilized $La_{0.85-0.95}MnO_Y$ perovskite oxide particles within, for example, a catalyzed flow-through component that forms part of the exhaust aftertreatment system. The catalyzed flow-through component is installed in, and forms part of, a contained passageway through which the exhaust flow navigates. In terms of construction, the catalyzed flow-through component is a monolithic honeycomb support structure that includes a front end, a rear end, and a plurality of isolated channels that extend from the front end to the rear end. The isolated channels are defined by a wall surface over which the $La_{0.85-0.95}MnO_Y$ perovskite oxide particles are deposited. A main function of the channels is to segregate and convey the exhaust flow through the catalyzed flow-through component while facilitating intimate contact between the segregated portions of the exhaust flow and the deposited $La_{0.85-0.95}MnO_Y$ perovskite oxide particles.

DETAILED DESCRIPTION OF PREFERRED EMBODIMENTS

Figure 1:
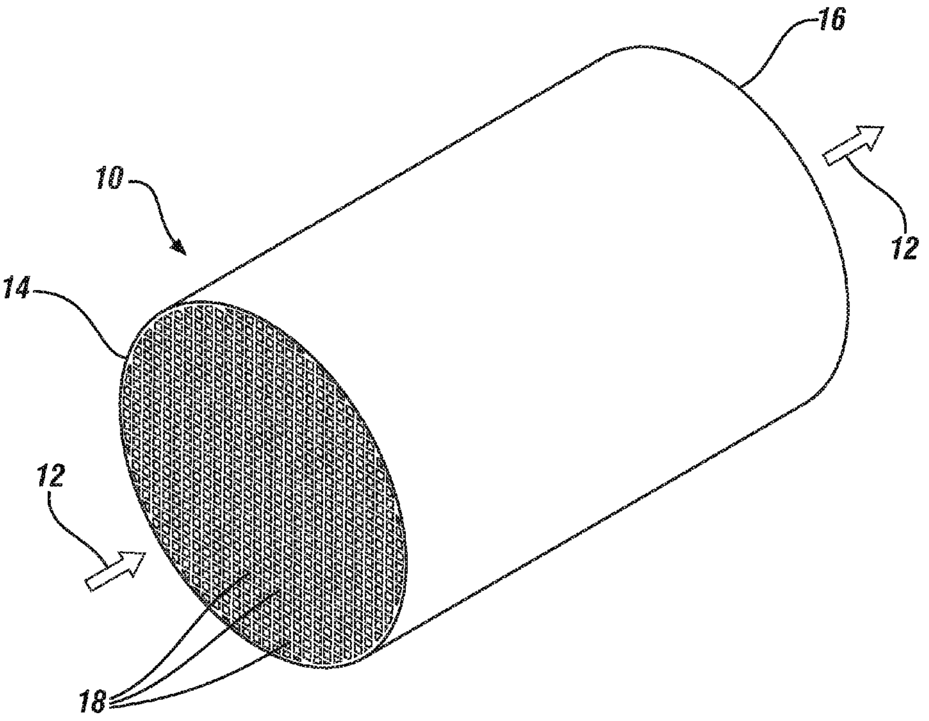
FIG. 1 is schematic illustration of a catalyzed flow-through component that may be incorporated into an exhaust aftertreatment system to facilitate exposure of an exhaust flow to immobilized particles of a $La_{0.85-0.95}MnO_Y$ perovskite oxide for the purpose of oxidizing NO contained in the exhaust flow to $NO_2$.

An exhaust aftertreatment system that treats an exhaust flow emanated from a hydrocarbon-fueled engine—such as an internal combustion engine that powers a vehicle—generally exposes the exhaust flow to several catalysts. These catalysts cooperatively decrease the concentrations of a variety of unwanted gaseous emissions to acceptable levels so that the exhaust flow exhibits a more innocuous composition when discharged to the environment. One of the unwanted gaseous emissions usually targeted for abatement is $NO_X$. The typical approach for decreasing the concentration of $NO_X$ is to convert both NO and $NO_2$ to $N_2$. A significant portion of the NO contained in the $NO_X$ constituency of the exhaust flow may have to be oxidized to $NO_2$ so that the overall conversion of $NO_X$ to $N_2$ can proceed with optimum efficiency. This is usually the case when the engine is combusting a lean mixture of air and fuel and the associated high-oxygen-content exhaust flow environment is not particularly favorable to a reduction reaction. A decrease in the $NO:NO_2$ molar ratio to roughly equimolar, or lower, has been shown to enhance $NO_X$ reduction to $N_2$ under such circumstances for various $NO_X$ treatment techniques that may be specifically employed in the exhaust aftertreatment system to accommodate lean-burn engine operation.

A non-stoichiometric perovskite oxide with adequate NO to $NO_2$ oxidative activity may be employed as fine particles within an exhaust aftertreatment system to decrease the $NO:NO_2$ molar ratio to a more desirable level. A perovskite oxide encompasses a broad class of non-noble mixed metal oxide compounds that are generally defined by an $ABO_3$ crystal lattice in which a larger, centrally located "A" cation and smaller surrounding "B" cations coordinate with twelve and six oxygen anions, respectively. The crystalline lattice of a perovskite oxide can accommodate different lattice defects that often create oxygen vacancies. These oxygen vacancies, without being bound by theory, are believed to contribute significantly to the perovskite oxide's oxidative activity as oxygen contained in the exhaust flow disassociates to fill those vacancies leaving behind residual oxygen radicals (or active oxygen) that quickly attack most organic and inorganic substances. A non-stoichiometric perovskite oxide is one in which the molar ratio of the "A" cation to the "B" cations in the $ABO_3$ crystal lattices does not equal 1.

A specific non-stoichiometric perovskite oxide that exhibits adequate NO to $NO_2$ oxidative activity has the general formula $La_XMnO_Y$ where the molar ratio of lanthanum to manganese, which is represented as "X" in the chemical formula, ranges from 0.85 to 0.95. The oxygen content, which is represented as "Y" in the chemical formula, fluctuates with variations in the molar ratio of lanthanum to manganese but generally falls somewhere in the range of 3.0 to 3.30. This particular class of non-stoichiometric perovskite oxides has a demonstrated NO oxidative activity that, in terms of NO to $NO_2$ conversion and hydrothermal durability over the temperature range typically experienced in an exhaust aftertreatment system, is superior to the NO oxidative activity of similar perovskite oxides with a higher molar ratio of lanthanum to manganese, such as $LaMnO_3$. The best-performing and most preferred $La_{0.85\text{-}0.95}MnO_Y$ perovskite oxide particles for oxidizing NO contained in the exhaust flow to $NO_2$ is $La_{0.9}MnO_Y$ followed by $La_{0.95}MnO_Y$.

The enhanced NO oxidative activity of the $La_{0.85\text{-}0.95}MnO_Y$ perovskite oxide particles is thought to be attributed to crystal lattice adjustments spurred by the decrease in the molar ratio of lanthanum to manganese away from stoichiometry. It seems that varying the molar ratio of lanthanum to manganese affects the concentrations of the two most prevalent manganese cation oxidation states—$Mn^{4+}$ and $Mn^{3+}$—that appear in the $La_XMnO_Y$ perovskite oxide. Specifically, an increase in both the surface and bulk concentrations of $Mn^{4+}$, and a related decrease in both the surface and bulk concentrations of $Mn^{3+}$, has been observed with a decreasing value of the molar ratio of lanthanum to manganese. Such observations suggest the atomic ratio of $Mn^{4+}/Mn^{3+}$ in the total manganese content of the $La_XMnO_Y$ perovskite oxide is inversely related to the value of "X." An increased concentration of $Mn^{4+}$, in turn, has been linked to the amount of available active oxygen (free radical oxygen species that are highly oxidative) contained in the $La_XMnO_Y$ perovskite oxide. A higher available amount of active oxygen has been shown to accompany a higher $Mn^{4+}$ content. This association is likely ascribed to the smaller radius and higher oxidation state of Mn4+, when compared to $Mn^{3+}$, as those two characteristics of $Mn^{4+}$ tend to increase the value of Y (oxygen content) in the $La_XMnO_Y$ perovskite oxide. The extra oxygen could be the source or a promoter of greater active oxygen availability. Setting the molar ratio of lanthanum to manganese ("X") between 0.85 and 0.95 in the non-stoichiometric $La_XMnO_Y$ perovskite oxide particles appears to coincide with a desirable balance of the $Mn^{4+}/Mn^{3+}$ atomic ratio, active oxygen availability, surface area, and thermal durability, all of which contribute to NO oxidative activity.

As part of an exhaust aftertreatment system, the $La_{0.85\text{-}0.95}MnO_Y$ perovskite oxide particles may be dispersed and immobilized in the flow path of the exhaust flow to effectively oxidize NO to $NO_2$. The $La_{0.85\text{-}0.95}MnO_Y$ perovskite oxide particles are sized to have a diameter of about 10 nm to about 100 μm. They may be deposited onto the interior wall surfaces of a flow-through component through which the exhaust flow passes. Any suitable technique known to skilled artisans may be used to deposit the particles such as, for example, washcoating. A variety of other catalyst particles and/or a high-surface area support material may be intermingled with the $La_{0.85\text{-}0.95}MnO_Y$ perovskite oxide particles, if desired, depending on the exhaust aftertreatment system architecture and the overall $NO_X$ to $N_2$ reduction strategy.

FIG. 1 illustrates a catalyzed flow-through component 10 that contains the $La_{0.85\text{-}0.95}MnO_Y$ perovskite oxide particles for the purpose of oxidizing NO to $NO_2$ and, possibly, some CO and HC's. The flow-through component 10 may be incorporated into an exhaust aftertreatment system for a hydrocarbon-fueled engine (not shown) that is designed to combust a mixture of air and fuel (A/F mixture). The exhaust aftertreatment system contains piping, joints, and other flow passage and connection features that, together, define a contained passageway configured to receive an exhaust flow 12 from the engine and to discharge a treated exhaust flow to the environment. The catalyzed flow-through component 10 forms part of the contained passageway through which the exhaust flow navigates. Other similarly-designed flow-through components having the same or different catalyst particle loadings and, if necessary, particulate filters, may also be included in the exhaust aftertreatment system to cooperatively treat the exhaust flow 12.

The hydrocarbon-fueled engine may be a multi-cylinder, reciprocating, internal combustion engine that is supplied with the A/F mixture, which is defined by an air to fuel mass ratio, in known controlled fashion. The engine may be fluidly coupled to an intake manifold, which delivers the precisely controlled A/F mixture to the engine's combustion cylinders, and an exhaust manifold, which collects the combustion products expelled from the engine and delivers them to the exhaust aftertreatment system as the exhaust flow 12. An electronic fuel injection system may continuously monitor and adjust the air to fuel mass ratio of the A/F mixture in accordance with an engine control strategy. A few examples of the hydrocarbon-fueled engine that may be employed are a charge-compression engine (i.e., a diesel engine), a spark-ignition direct injection engine (i.e., a gasoline engine), and a homogeneous charge-compression engine.

The air to fuel mass ratio of the A/F mixture fed to the engine may be lean of stiochiometry either part of the time or all of the time. For example, a mixture of air and standard petrol-based gasoline is considered lean of stoichiometry when the air to fuel mass ratio is greater than about 14.7. The stoichiometric air to fuel mass ratios above which the A/F mixture is considered lean for diesel fuel, biofuels, and ethanol-based fuels can be slightly or considerably different. A lean A/F mixture, when combusted, typically affords the exhaust flow 12 with a relatively high oxygen content in the range of 1.0 to 10 vol. %, a $NO_X$ content anywhere from 50 ppmv to 1500 ppmv, a partially burned or unburned hydrocarbon content anywhere from 250 ppmv to 750 ppmv, a CO content anywhere from 50 ppmv to 500 ppmv, maybe some suspended particulate matter, and the balance nitrogen, water, and carbon dioxide. The $NO_X$ content is usually comprised of greater than 90 mol % NO and less than 10 mol % $NO_2$ to provide a NO:$NO_2$ molar ratio of about 9 or greater.

The flow-through component 10 is a monolithic honeycomb support structure that includes a front end 14, a rear end 16, and a plurality of isolated channels 18, usually several hundred per square inch, that extend from the front end 14 to the rear end 16. The front end 14 is piped or otherwise configured to receive the exhaust flow 12 and the rear end 16 is piped or otherwise configured to discharge the exhaust flow 12 downstream within the exhaust aftertreatment system. The isolated channels 18 are defined by a wall surface over which the $La_{0.85\text{-}0.95}MnO_Y$ perovskite oxide particles are deposited. A main function of the channels 18 is to segregate and convey the exhaust flow 12 through the catalyzed flow-through component 10 while facilitating intimate contact between the segregated portions of the exhaust flow 12 and the deposited $La_{0.85\text{-}0.95}MnO_Y$ perovskite oxide particles. The monolithic honeycomb support structure can be made from a variety of materials. Some suitable materials that can withstand the temperature and chemical environment associated with the exhaust flow 12 are ceramics and heat and corrosion resistant metals. Some specific examples of ceramics include extruded cordierite, silicon carbide, silicon nitride, zirconia, mullite, spodumene, alumina-silica-magnesia, zirconium silicate, sillimanite, and petalite. Some specific examples of heat and corrosion resistant metals include titanium and stainless steel.

To achieve effective NO oxidation, the $La0.85\text{-}0.95MnO_Y$ perovskite oxide particles may be deposited within the isolated channels 18 at a loading of about 5 grams to about 200 grams per liter of flow volume over the particles. The $La_{0.85\text{-}0.95}MnO_Y$ perovskite oxide particles may be deposited over the entire length of the channels 18 or, alternatively, they may be restricted to a discrete zone. Depositing the $La_{0.85\text{-}0.95}MnO_Y$ perovskite oxide particles may be performed, as mentioned before, by a washcoating technique. A typical washcoating technique involves several steps. First, the $La_{0.85\text{-}0.95}MnO_Y$ perovskite oxide particles are dissolved in an appropriate liquid medium to form a washcoating solution. Second, the monolithic honeycomb support structure is immersed into the washcoating solution to dip-coat the isolated channels 18 with a film of the solution. Third, the monolithic honeycomb support structure is removed from the washcoating solution and the excess drag-out is allowed to drip out of the isolated channels 18 or is forced out, for example, by an air knife. Lastly, the washcoating solution film adhered to the wall surfaces of the isolated channels 18 is calcined at an elevated temperature. This last heat-treatment step drives off any residual liquid medium and conditions the layer of $La_{0.85\text{-}0.95}MnO_Y$ perovskite oxide particles left behind for exposure to the exhaust flow 12.

Particles of at least one other catalyst may be intermingled with the $La_{0.85\text{-}0.95}MnO_Y$ perovskite oxide particles or be confined to a separate zone within the monolithic honeycomb support structure. These other catalyst particles may include a platinum group metal (Pt, Pd, Rh), an alkali or alkaline earth metal oxide/carbonate (CaO, MgO, BaO, $BaCO_3$, $K_2O$, $K_2CO_3$), a base metal ion-substituted zeolite (Fe and/or Cu substituted β-type, Y-type, ZSM-5, Chabazite, ultra-stable Y-type), a base metal ion-substituted silicoaluminophosphate (Fe and/or Cu substituted SAPO-5, SAPO-11, SAPO-34, SAPO-44), or a mixture thereof. A high surface-area base metal oxide and/or mixed metal oxide may also be combined with the $La_{0.85\text{-}0.95}MnO_Y$ perovskite oxide particles and/or, if present, the other catalyst particles, to provide oxygen storage capacity, catalyst stability, and/or support for the water gas shift reaction. Some specific base metal oxides and/or mixed metal oxides that may be used include $Al_2O_3$, $CeO_2$, $CeO_2$—$ZrO_2$, CuO—$CeO_2$, $Pr_6O_{11}$, and $Pr_6O_{11}$—$CeO_2$, to name but a few. Each of the various other catalyst particles and the base/mixed metal oxide particles are sized to have a diameter of about 10 nm to about 100 μm. The one or other more catalyst particles and the base/mixed metal oxide particles may be added to the same washcoating solution as the $La_{0.85\text{-}0.95}MnO_Y$ perovskite oxide particles, if the various particles are intended to be intermingled, or they may be washcoated from a separate washcoating solution, if the various particles are intended to be confined to separate zones within the monolithic honeycomb support structure.

A method of using the $La_{0.85\text{-}0.95}MnO_Y$ perovskite oxide particles to oxidize NO to $NO_2$ can be practiced with the catalyzed flow-through component 10 for any of a variety of purposes within the exhaust aftertreatment system. The flow-through component 10 permits the $La_{0.85\text{-}0.95}MnO_Y$ perovskite oxide particles to be exposed to the exhaust flow 12 so that NO to $NO_2$ oxidation can proceed as intended. Specifically, the exhaust flow 12, which is produced by combustion of the A/F mixture in the engine, is directed through the isolated channels 18 of the monolithic honeycomb support structure to achieve intimate contact between the segregated portions of the exhaust flow 12 and the $La_{0.85-0.95}MnO_Y$ perovskite oxide particles. When the A/F mixture fed to the engine for combustion is defined by a lean air to fuel mass ratio, the NO to $NO_2$ oxidative activity of the $La_{0.85-0.95}MnO_Y$ perovskite oxide particles decreases the NO:$NO_2$ molar ratio of the $NO_X$ content in the exhaust flow 12 and helps contribute to the overall $NO_X$ conversion efficiency of the exhaust aftertreatment system.

The catalyzed flow-through component 10 may, for example, comprise a mixture of the $La_{0.85-0.95}MnO_Y$ perovskite oxide particles and palladium particles deposited over the interior wall surfaces of the isolated channels 18. The loadings of these catalyst particles may be 50 to 150 grams of the $La_{0.85-0.95}MnO_Y$ perovskite oxide particles and 0.10 to 3.5 grams of the palladium particles per liter of flow volume over those particles (since they are intermixed). Such a catalyst particle mixture is a viable alternative to a conventional diesel oxidation catalyst that generally includes a mixture of platinum and palladium. The flow-through component 10 which houses this particular catalyst particle mixture may be close-coupled to the hydrocarbon-fueled engine to receive the exhaust flow 12 immediately as it enters the exhaust aftertreatment system. When the exhaust flow 12 is derived from the combustion of a lean A/F mixture, the $La_{0.85-0.95}MnO_Y$ perovskite oxide particles primarily oxidize NO to $NO_2$ and the palladium particles primarily oxidize CO and HC's to $CO_2$ and water. After exiting the flow-through component 10, the exhaust flow 12 traverses the remainder of the exhaust aftertreatment system so the NO and $NO_2$, which are now present in a lower NO:$NO_2$ molar ratio, can be converted to $N_2$ more efficiently (usually by a downstream SCR system or an LNT).

The catalyzed flow-through component 10 may, as another example, comprise a mixture of the $La_{0.85-0.95}MnO_Y$ perovskite oxide particles, alkali or alkaline earth metal oxide/carbonate particles such as BaO and $BaCO_3$, and rhodium particles. The loadings of these catalyst particles may be 100 to 150 grams of the $La_{0.85-0.95}MnO_Y$ perovskite oxide particles, 10 to 50 grams of the alkali or alkaline earth metal oxide/carbonate particles, and 0.05 to 0.50 grams of the rhodium particles per liter of flow volume over those several particles. A base material such as $CeO_2$—$ZrO_2$ may be intermixed as particles with the previously-mentioned catalyst particles at a loading of 30 to 300 grams per liter of flow volume over the catalyst particles and the base material particles (since they are all intermixed). This particular catalyst particle mixture may be employed to serve as a lean $NO_X$ trap. When the exhaust flow 12 is derived from the combustion of a lean A/F mixture, the $La_{0.85-0.95}MnO_Y$ perovskite oxide particles primarily oxidize NO to $NO_2$. The alkali or alkaline earth metal oxide/carbonate particles absorb the originally-present and newly produced $NO_2$ as a nitrate species. At some point, the air to fuel mass ratio of the A/F mixture is lowered from lean to stoichiometric or rich. The exhaust flow 12 is now primed to facilitate desorption of $NO_X$ from the alkali or alkaline earth metal oxide/carbonate particles and to reduce $NO_X$ to $N_2$ over the rhodium particles. The air to fuel mass ratio of the A/F mixture is eventually switched back to lean after the alkali or alkaline earth metal oxide/carbonate particles have been sufficiently regenerated.

The catalyzed flow-through component 10 may, as yet another example, comprise a mixture of the $La_{0.85-0.95}MnO_Y$ perovskite oxide particles and at least one of base metal ion-substituted zeolite particles, such as a Fe and/or Cu substituted β-type or Y-type zeolite, or base metal ion-substituted silicoaluminophosphate particles. The loadings of these catalyst particles may be 5 to 75 grams of $La_{0.85-0.95}MnO_Y$ perovskite oxide particles and 100 to 180 grams of the base metal ion-substituted zeolite particles and/or the base metal ion-substituted silicoaluminophosphate particles per liter of flow volume over those particles. A base material such as $CeO_2$—$ZrO_2$ may be intermixed as particles with the previously-mentioned catalyst particles at a loading of 30 to 300 grams per liter of flow volume over the catalyst particles and the base material particles (since they are all intermixed). This particular catalyst particle mixture may be employed to promote selective catalytic reduction of $NO_X$ contained in the exhaust flow 12. When the exhaust flow 12 is derived from the combustion of a lean A/F mixture, the $La_{0.85-0.95}MnO_Y$ perovskite oxide particles oxidize some of the NO to $NO_2$. The base metal ion-substituted zeolite particles and/or the base metal ion-substituted silicoaluminophosphate particles catalytically convert $NO_X$ (both NO and $NO_2$) into $N_2$ in the presence of oxygen and a reductant which has been passively generated or injected into the exhaust flow 12 by a conventional metering system upstream of the catalyzed flow-through component 10. The reductant is preferably ammonia (either directly injected or derived from urea), a hydrocarbon (i.e, an alkane or alkanes), or an oxygenated hydrocarbon (i.e, ethanol or formaldehyde).

The $La_{0.85-0.95}MnO_Y$ perovskite oxide particles may be formed at least in part by the citrate method. This method comprises, in general, a complexation step, a dehydration step, a combustion step, and a calcination step. These steps describe the general chemical metamorphosis taking place and are usually performed in succession. Their precise beginning and end may not always be discernable. The prepared $La_{0.85-0.95}MnO_Y$ perovskite oxide particles may then be incorporated into a washcoat solution and applied to the isolated channels 18 of the monolithic honeycomb support structure. Moreover, as mentioned before, the washcoat solution may contain a base metal oxide and/or a mixed metal oxide as well as other fine catalyst particles in addition to the $La_{0.85-0.95}MnO_Y$ perovskite oxide particles depending on the intended use of the catalyst particle mixture. The additional catalyst particles may comprise a platinum group metal (Pt, Pd, Rh), an alkali or alkaline earth metal oxide/carbonate (CaO, MgO, BaO, $BaCO_3$, $K_2O$, $K_2CO_3$), a base metal ion-substituted zeolite (Fe and/or Cu substituted β-type, Y-type, ZSM-5, Chabazite, ultra-stable Y-type), a base metal ion-substituted silicoaluminophosphate (Fe and/or Cu substituted SAPO-5, SAPO-11, SAPO-34, SAPO-44), or a mixture thereof.

In the complexation step, citric acid and salts of lanthanum and manganese are dissolved in water to form an aqueous liquid medium. The salts of lanthanum and manganese dissociate and the resultant lanthanum and manganese cations react with the citric acid's carboxyl functional groups to form atomically homogeneous citrate complexed mixed metal compounds. The salts of lanthanum and manganese may be in the form of nitrates. These salt forms are favored because they produce very little, if any, by-product residues when thermally decomposed and, during such thermal decomposition, evolve a relatively large amount of gas which promotes extensive particle surface area and porosity. The mixing conditions associated with forming the citrate complexed mixed metal compounds may vary but, in general, the aqueous based liquid medium is agitated for about 30 minutes to about 3 hours at room temperature.

The aqueous liquid medium may be a water-based solution or emulsion and generally includes enough water to easily dissolve the salts of lanthanum and manganese. The respective amounts of lanthanum and manganese salts included in the aqueous liquid medium are predetermined to provide a non-stoichiometric molar ratio of lanthanum cations to manganese cations that ranges from 0.85 to 0.95 and to prepare a total desired amount of the $La_{0.85\text{-}0.95}MnO_Y$ perovskite oxide particles. The amount of citric acid included in the aqueous liquid medium is preferably 10 mol. % in excess of stoichiometry. A stoichiometric amount of citric acid is the amount that provides a functional carboxyl group (2 per citric acid molecule) for each dissolved lanthanum and manganese cation. This amount can be calculated by dividing the total mols of constituent metal cations (those of La and Mn) expected to be dissolved in the aqueous liquid medium by two and then multiplying that number, first, by 1.10 and second, by the molecular weight of citric acid (192 g/mol for anhydrous and 210 g/mol for monohydrate), as shown in the following abbreviated equation:

$$10\text{ mol \% citric acid} = \left(\frac{\text{total } mols \text{ of dissolved La and Mn}}{2}\right) \times (1.10) \times (\text{MW citric acid})$$

In the dehydration step, the water component of the aqueous liquid medium is removed to concentrate the citrate complexed mixed metal compounds. The resultant semi-anhydrous material is a three-dimensional amorphous gel or syrup that, on a molecular level, is akin to a polymer structure in which the multifunctional citric acid molecules are linked to the constituent lanthanum and manganese cations. The water component may be evaporated by heating the liquid medium between about 60° C. and 150° C. at ambient pressure or under a moderate vacuum, with or without agitation, until most of the water is removed. A small amount of nitrate salts, if used to dissolve the lanthanum and manganese cations, may also decompose and evolve from the aqueous liquid medium during dehydration in the form of nitrogen oxides (NO and $NO_2$).

In the combustion step, the amorphous gel is thermally decomposed into a brittle, dry, and porous mixed metal oxide particle mass. The thermal decomposition of the amorphous gel burns off both the residual nitrates and the citrate portion of the citrate complexed mixed metal compounds. The resultant mixed metal oxides are primarily defined by crystallographic lattice structures that are dissimilar from the $ABO_3$ crystal structure of a perovskite oxide. The amorphous gel may be heated, in air, from the temperature achieved during dehydration at a constant rate of, for example, about 2-15° C. per minute, up to a temperature between about 200° C. and 300° C. for about 5 minutes to about 2 hours to effectuate thermal decomposition. The evolution of nitrogen oxide gases (derived from residual nitrates) and normal organic combustion gas products (derived from the citrate portion of the citrate complexed mixed metal compounds) during combustion stimulate porosity and surface morphological characteristics that help refine the resultant mixed metal oxide particle mass into its very delicate, loosely-adhered, fine particle mass.

In the calcination step, the brittle mixed metal oxide particle mass is crushed and heated to form fine and lightweight $La_{0.85\text{-}0.95}MnO_Y$ perovskite oxide particles. The crushed mixed metal oxide particles may be heated in air to a temperature ranging from about 675° C. to about 1100° C. for about 2 to about 6 hours to crystallographically reconfigure the mixed metal oxide particles into the $La_{0.85\text{-}0.95}MnO_Y$ perovskite oxide particles with their ascribed crystal lattice structure. The exact mechanism by which this crystal lattice reconfiguration proceeds is not entirely understood. Higher calcinations temperatures do, however, generally cultivate the $La_{0.85\text{-}0.95}MnO_Y$ perovskite oxide particles faster than lower calcinations temperatures. The crushed mixed metal oxide particles may, for example, in a preferred embodiment, be heated in static air to a temperature of about 700° C. for a period of about five hours.

After calcination, the $La_{0.85\text{-}0.95}MnO_Y$ perovskite oxide particles may be further refined, if desired, to reduce their size even more before being incorporated into a washcoat solution. Ball milling or any other known particle refinement process may be used to achieve such an objective.

EXAMPLE

This Example demonstrates the properties and the NO to $NO_2$ catalytic oxidative activity of $La_XMnO_Y$ perovskite oxide particles in which the lanthanum and manganese metal cations are present in a non-stoichiometric molar ratio ("X") of 0.85 to 0.95. The value of Y in this Example is sometimes replaced by the symbol "3+δ" with "δ" ranging from 0 to 0.30. This designation is merely an alternative expression for Y that focuses on variations in the unit cell oxygen content at the tenths and hundredth decimal locations. The subscript "Y" and "3+δ" represent the same numerical range of 3.0 to 3.30 for all intents and purposes. The value of "δ" is sometimes referred to as the over stoichiometric coefficient.

Five samples of single phase $La_XMnO_Y$ perovskite oxide particles with different molar ratios of La to Mn were prepared (X=0.9, 0.95, 1.0, 1.05, and 1.11) by the citric acid method using metal nitrates of Lanthanum and manganese. For each sample, the appropriate amounts of $La(NO_3)_3$ and $Mn(NO_3)_2$ were dissolved in de-ionized water followed by stirring for about 10 minutes. Citric acid monohydrate was then added to the solution at 10 mol % in excess of stoichiometry. The solution was stirred for about 10 minutes to complex the La and Mn cations. Next, the solution was set on a stirring and heating plate and heated to 80° C. under continuous stirring to slowly evaporate the water until the solution became a viscous gel. Afterwards, the temperature was ramped up at a rate of 10° C. per minute to further heat the viscous gel and initiate gas evolution. The evolution of NO and $NO_2$ gases began around 150° C. and, when the temperature reached just below 300° C., the citrate ions combusted vigorously and caused a large spike in temperature and powder displacement. The powder was covered with several layers of $ZrO_2$ balls to prevent powder displacement yet still allow for gas mobility. The resulting spongy material was crushed and calcined at 700° C. for about 5 hours in a flow of air to produce the fresh $La_XMnO_Y$ perovskite oxide particle sample. To age the particle sample, it was placed in the middle of the tube reactor between two clogs of quartz wool and exposed to a continuous flow of 10 vol. % $H_2O$ in air at a gas hourly space velocity of 30,000 $h^{-1}$ for 12 hours at 800° C.

X-ray diffraction patterns (not shown) of each sample before (fresh) and after aging (aged) were taken using a X'Pert Pro diffractometer operated at 40 kV and 40 mA with nickel-filtered Cu Kα in the range of $20° < 2\theta < 90°$ and a resolution of 0.02° step size. Single phase perovskite oxide structures were observed for each sample both before and after aging. The $La_{0.9}MnO_Y$ and $La_{0.95}MnO_Y$ perovskite oxide samples underwent a crystal structure symmetry rearrangement from orthorhombic to rhombohedral when aged.

This was likely the result of the hydrothermal aging conditions in which the samples were exposed to a relatively high temperature and an oxidizing environment. The $LaMnO_Y$, $La_{1.05}MnO_Y$, and $La_{1.11}MnO_Y$ perovskite oxide particle samples did not experience a crystal structure transition. They each exhibited a rhombohedral symmetry both before and after aging. In terms of lattice parameters and particles sizes, which were calculated from the XRD data, a decrease in the molar ratio of La to Mn (i.e., the value of X) appeared to coincide with (1) a decrease in the unit cell volume of the perovskite oxide, (2) an increase in the $Mn^{4+}$ content in the perovskite oxide unit cell, and an increase in oxygen (or δ in the 3+δ expression) in the perovskite oxide unit cell.

The BET surface area ($m^2/g$) of each particle sample, while fresh and after aging, is shown below in Table 1. The BET surface area was determined by $N_2$ at −196° C. using a F-Sorb 3400 volumetric absorption/desorption apparatus after the samples were degassed at 150° C. under vacuum for approximately three hours.

TABLE 1

Surface Area of Fresh and Aged Samples

| $S_{BET}$ ($m^2/g$) | $La_{0.9}MnO_{3+\delta}$ | $La_{0.95}MnO_{3+\delta}$ | $LaMnO_3$ | $La_{1.05}MnO_{3+\delta}$ | $La_{1.11}MnO_{3+\delta}$ |
|---|---|---|---|---|---|
| Fresh | 23.1 | 15.4 | 19.5 | 17.5 | 14.5 |
| Aged | 16.5 | 8.1 | 9.0 | 7.9 | 7.7 |

As can be seen, the surface areas ranged from 14.5-23.1 for the fresh samples and 7.7-16.5 for the aged samples. The $La_{0.9}MnO_{3+\delta}$ perovskite oxide particles had the highest surface area of both the fresh and aged samples by a significant margin. The other four perovksite oxide samples were more comparable overall especially in their aged surface areas. The loss in surface area observed after aging in each sample is most likely due to sintering of the $La_XMnO_Y$perovskite oxide particle samples at high temperatures.

Figure 2:
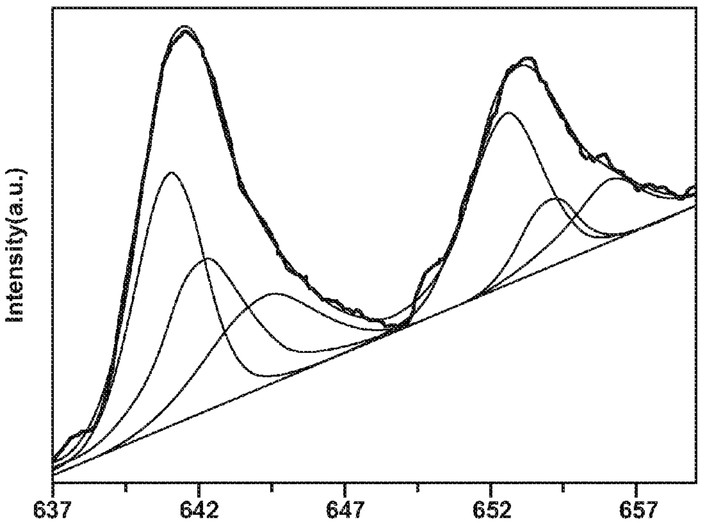
FIG. 2 depicts the X-ray photoelectron spectrum (XPS) of the manganese 2p electron shell for a sample of fresh $La_{0.9}MnO_Y$ perovskite oxide particles.
Figure 3:
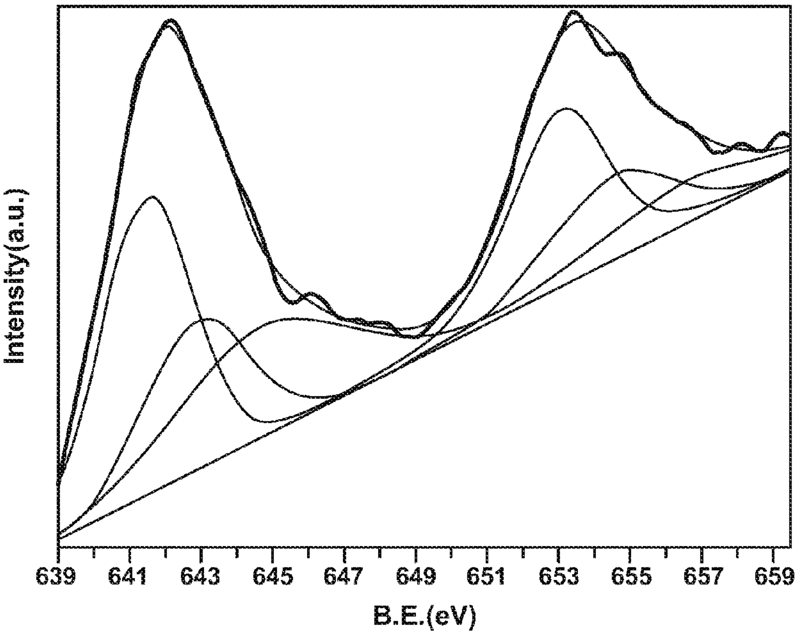
FIG. 3 depicts the X-ray photoelectron spectrum (XPS) of the manganese 2p electron shell for a sample of fresh $LaMnO_Y$ perovskite oxide particles.
Figure 4:
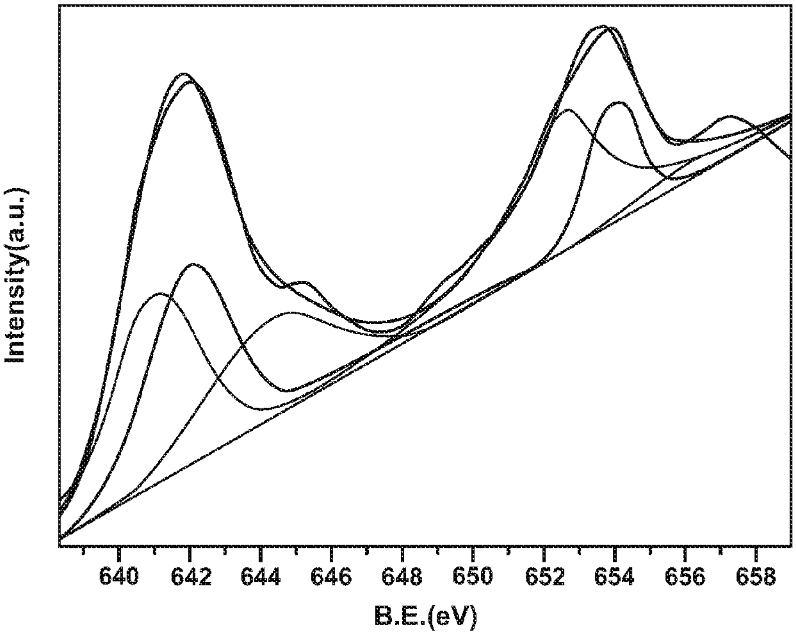
FIG. 4 depicts the X-ray photoelectron spectrum (XPS) of the manganese 2p electron shell for a sample of fresh $La_{1.11}MnO_Y$ perovskite oxide particles.

The X-ray photoelectron spectra (XPS) of the oxygen 1s and the manganese 2p electron shells of each sample, before aging, were developed on a PHI-5300 ESCA system with Al Kα radiation under UHV ($1.33\times10^{-8}$ Pa) and calibrated internally by the carbon deposit C 1s binding energy (BE) at 284.8 eV. The oxygen 1s spectrum was analyzed from three peak areas: 529.3~529.9 eV, 531.0~531.4 eV, and above 533 eV. The peak at the lower binding energy corresponds to lattice oxygen ($O^{-2}$) and the peak at the higher binding energy corresponds to adsorbed water. The peak at the intermediate binding energy was assigned to both hydroxyl ($OH^-$) and carbonate ($CO_3^{2-}$) species. With respect to the manganese 2p spectrum, the peak around 642.4 corresponds to $Mn^{4+}$ and the peak around 641.3 corresponds to $Mn^{3+}$. The XPS of the manganese 2p electron shell for only the fresh $La_{0.9}MnO_Y$, $LaMnO_Y$, and $La_{1.11}MnO_Y$ particle samples are shown in FIGS. 2-4, respectively, as examples of the XPS data profiles obtained.

The atomic ratio results calculated from the XPS data profiles, which are tabulated below in Table 2, reveal the surface concentration of $Mn^{4+}$ in the total manganese constituency ($Mn^{4+}$+$Mn^{3+}$) of the fresh $La_XMnO_Y$ perovskite oxide samples was inversely related to the molar ratio of lanthanum to manganese ("X"). For instance, about 46% of the surface manganese in the fresh $La_{0.9}MnO_{3+\delta}$ perovskite oxide sample constituted $Mn^{4+}$, with the other 54% being $Mn^{3+}$, compared to about 36% and about 26% in the fresh $LaMnO_{3+\delta}$ and $La_{1.11}MnO_{3+\delta}$ perovskite oxide samples, respectively. There did not appear to be any correlation between the amount of lattice oxygen and the molar ratio of lanthanum to manganese in the $La_XMnO_Y$ perovskite oxide samples.

TABLE 2

Binding Energy and atomic ratios of Oxygen and Manganese in the Fresh Samples

| Sample | O 1s | | Mn 2p | |
|---|---|---|---|---|
| $La_{0.9}MnO_{3+\delta}$ | 529.1 eV | 50% | 641.1 eV | 54% |
| | 531.1 eV | 38% | 642.2 eV | 46% |
| | 533.0 eV | 12% | 644.2 eV | |
| $La_{0.95}MnO_{3+\delta}$ | 529.3 eV | 13% | 641.0 eV | 58% |
| | 531.7 eV | 54% | 642.2 eV | 42% |
| | 533.0 eV | 33% | 644.2 eV | |
| $LaMnO_{3+\delta}$ | 529.2 eV | 41% | 641.0 eV | 64% |
| | 531.6 eV | 45% | 642.4 eV | 36% |
| | 533.0 eV | 14% | 644.2 eV | |
| $La_{1.05}MnO_{3+\delta}$ | 529.2 eV | 44% | 641.0 eV | 66% |
| | 531.7 eV | 44% | 642.4 eV | 34% |
| | 533.0 eV | 12% | 644.2 eV | |
| $La_{1.11}MnO_{3+\delta}$ | 529.2 eV | 54% | 641.0 eV | 74% |
| | 531.6 eV | 33% | 642.0 eV | 26% |
| | 533.0 eV | 13% | 644.2 eV | |

The bulk $Mn^{4+}$ content and the value of "δ" of the fresh $La_XMnO_{3+\delta}$ perovskite oxide particle samples were further determined by redox titration. The XPS for the fresh samples just discussed analyzed only the surface manganese content of the samples. To determine the bulk $Mn^{4+}$ content and the value of δ of each of the fresh samples, an adaption of the idometry method, as described in Zhu et al, *Catalysis Letters* 135 (2010) 152, was used. An assumption was made that lanthanum existed in the 3+ oxidation state and manganese existed in the 3+ and 4+ oxidation states. A flask that contained a standard solution of 0.1 mol/L HCL and 0.1 mol/L KI was prepared and warmed to about 50° C. This standard HCl/KI solution was chosen because it can reduce both $Mn^{4+}$ and $Mn^{3+}$ to divalent manganese. Next, the sample was added and mixed into the solution and, after being completely dissolved, the solution was cooled to room temperature in a dark place. The solution was then titrated with standard sodium thiosulfate using starch as the indicator. The following reactions occurred in solution:

$$2Mn^{3+}+2Cl^-\rightarrow Cl_2+2Mn^{2+}$$

$$Mn^{4+}+2Cl^-\rightarrow Cl_2+Mn^{2+}$$

$$Cl_2+2I^-\rightarrow 2Cl^-+I_2$$

$$2S_2O_3^{2-}+I_2\rightarrow 2I^-+S_4O_6^{2-}$$

Figure 5:
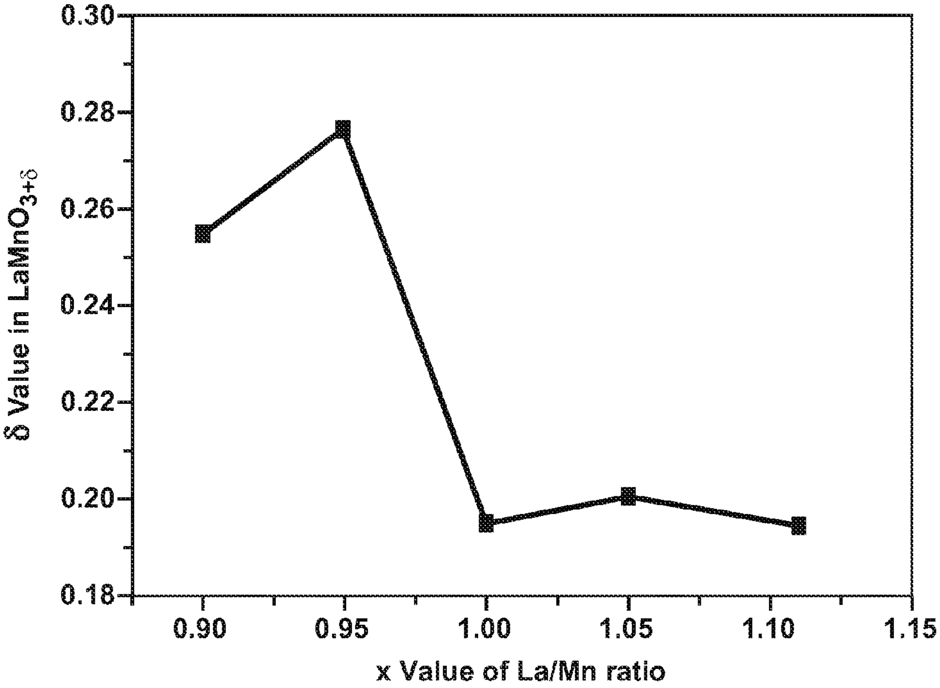
FIG. 5 is a graph that shows the "δ" value for particle samples of fresh $La_{0.9}MnO_Y$ perovskite oxide, fresh $La_{0.95}MnO_Y$ perovskite oxide, fresh $LaMnO_Y$ perovskite oxide, fresh $La_{1.05}MnO_Y$ perovskite oxide, and fresh $La_{1.11}MnO_Y$ perovskite oxide. Redox titration was used to develop the graph shown in FIG. 5. The value of δ, often referred to as the over stoichiometric coefficient, is related to the value of Y in the non-stoichiometric perovskite oxide chemical formula ($La_XMnO_Y$). The value of Y is equal to 3+δ with δ ranging from 0 to 0.30. The designation 3+δ is merely an alternative expression for Y that focuses on variations in the unit cell oxygen content at the tenths and hundredth decimal positions. The subscript "Y" and "3+δ" represent the same numerical range of 3.0 to 3.30 for all intents and purposes.
Figure 6:
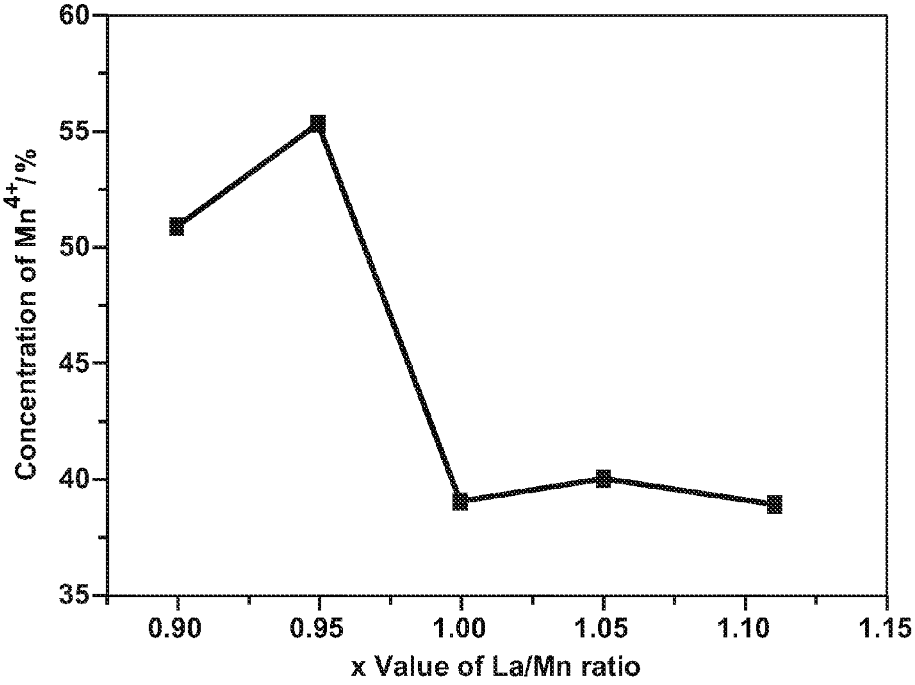
FIG. 6 is a graph that shows the bulk $Mn^{4+}$ concentration of the total manganese constituency ($Mn^{4+}$+$Mn^{3+}$) for particle samples of fresh $La_{0.9}MnO_Y$ perovskite oxide, fresh $La_{0.95}MnO_Y$ perovskite oxide, fresh $LaMnO_Y$ perovskite oxide, fresh $La_{1.05}MnO_Y$ perovskite oxide, and fresh $La_{1.11}MnO_Y$ perovskite oxide. The same redox titration method used to develop the graph shown in FIG. 5 was used to develop the graph shown in FIG. 6.

The bulk $Mn^{4+}$ concentration of the total manganese constituency ($Mn^{4+}$+$Mn^{3+}$) and the value of δ for the fresh $La_XMnO_Y$ perovskite oxide particle samples are shown in FIGS. 5 and 6, respectively. Similar to the data derived from the XRD patterns and the XPS spectra of the fresh samples, the bulk concentration of $Mn^{4+}$ in the total manganese constituency ($Mn^{4+}$+$Mn^{3+}$) of the fresh $La_XMnO_Y$ perovskite oxide samples was inversely related to the molar ratio of lanthanum to manganese ("X"). The concentration of $Mn^{4+}$ in both the $La_{0.9}MnO_{3+\delta}$ and the $La_{0.95}MnO_{3+\delta}$ samples was significantly higher than what was observed for the other samples. An increase in the over stoichiometric coefficient δ was also observed for the $La_{0.9}MnO_{3+\delta}$ and the $La_{0.95}MnO_{3+\delta}$ samples relative to the others.

Figure 7:
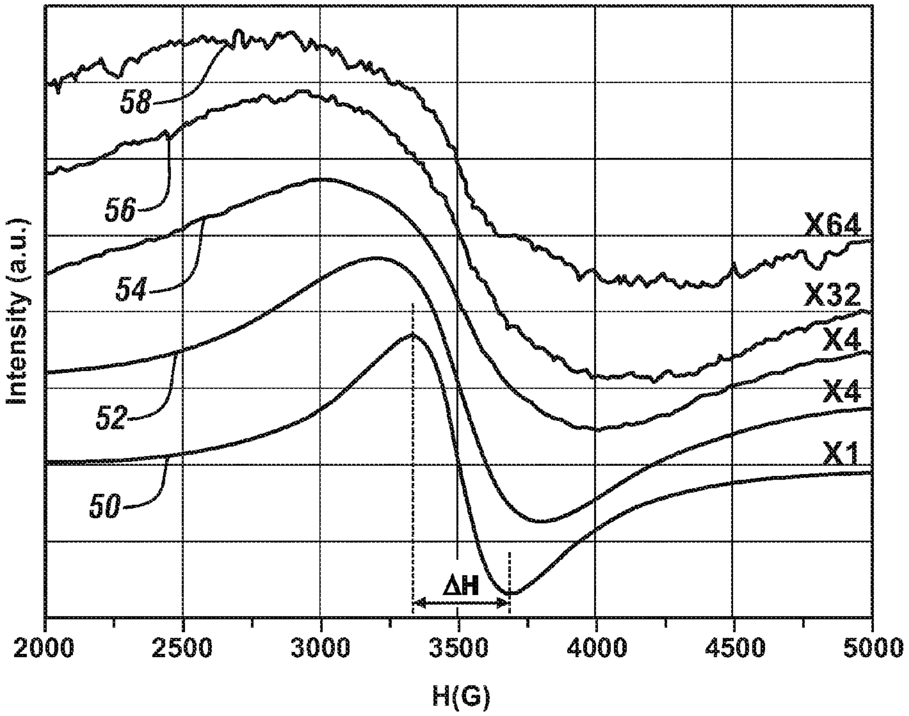
FIG. 7 depicts the electron paramagnetic resonance spectra (EPR) for particle samples of fresh $La_{0.9}MnO_Y$ perovskite oxide, fresh $La_{0.95}MnO_Y$ perovskite oxide, fresh $LaMnO_Y$ perovskite oxide, fresh $La_{1.05}MnO_Y$ perovskite oxide, and fresh $La_{1.11}MnO_Y$ perovskite oxide. The EPR spectra were determined using a constant frequency of 9.78 GHz while the magnetic field was swept starting from 2000 G (gauss). The linewidth (ΔH in G) and g-values of each fresh sample were determined from the EPR spectra.
Figure 8:
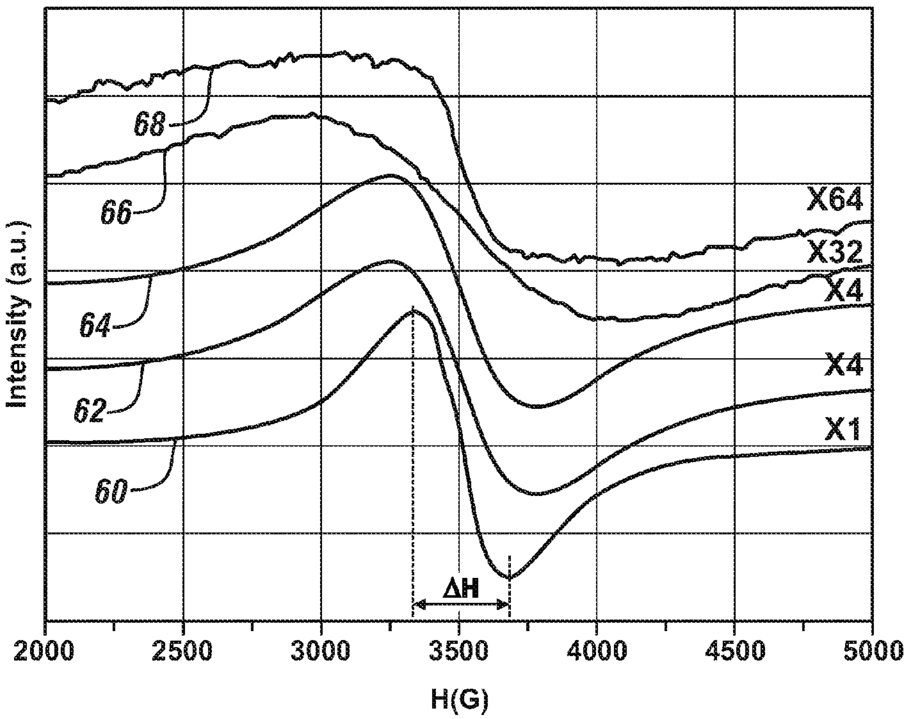
FIG. 8 depicts the electron paramagnetic resonance spectra (EPR) for particle samples of aged $La_{0.9}MnO_Y$ perovskite oxide, aged $La_{0.95}MnO_Y$ perovskite oxide, aged $LaMnO_Y$ perovskite oxide, aged $La_{1.05}MnO_Y$ perovskite oxide, and aged $La_{1.1}MnO_Y$ perovskite oxide. The EPR spectra were determined using a constant frequency of 9.78 GHz while the magnetic field was swept starting from 2000 G (gauss). The linewidth (ΔH in G) and g-values of each aged sample were determined from the EPR spectra.

The electron paramagnetic resonance spectra (EPR) of each sample, both before and after aging, are shown in FIGS. 7 and 8. FIG. 7 represents the EPR spectra of the fresh $La_XMnO_Y$ perovskite oxide particle samples and FIG. 8 represents the EPR spectra of the aged $La_XMnO_Y$ perovskite oxide particle samples. The EPR spectra were collected using a Bruker model A320 X-band EPR spectrometer at room temperature and a constant frequency of 9.78 GHz. The magnetic field was swept starting from 2000 G (gauss) and the g-values were determined from precise frequency and magnetic field values. The identifications of the EPR spectra and the results calculated from those spectra are shown below in Table 3, which corresponds to FIG. 7, and Table 4, which corresponds to FIG. 8.

TABLE 3

EPR Spectra Identifications in FIG. 7 and Calculated Results for the Fresh $La_XMnO_Y$ Samples

| Sample | Reference Numeral | ΔH (G) | g-value |
|---|---|---|---|
| $La_{0.9}MnO_{3+\delta}$ | 50 | 358 | 1.9920 |
| $La_{0.95}MnO_{3+\delta}$ | 52 | 578 | 1.9923 |
| $LaMnO_{3+\delta}$ | 54 | 1024 | 1.9936 |
| $La_{1.05}MnO_{3+\delta}$ | 56 | 1270 | 1.9924 |
| $La_{1.11}MnO_{3+\delta}$ | 58 | 1438 | 1.9991 |

TABLE 4

EPR Spectra Identifications in FIG. 8 and Calculated Results for the Aged $La_XMnO_Y$ Samples

| Sample | Reference Numeral | ΔH (G) | g-value |
|---|---|---|---|
| $La_{0.9}MnO_{3+\delta}$ | 60 | 337 | 1.9931 |
| $La_{0.95}MnO_{3+\delta}$ | 62 | 531 | 1.9904 |
| $LaMnO_{3+\delta}$ | 64 | 848 | 1.9907 |
| $La_{1.05}MnO_{3+\delta}$ | 66 | 1167 | 1.9910 |
| $La_{1.11}MnO_{3+\delta}$ | 68 | 1000 | 1.9981 |

A noticeable trend in the EPR spectra for both the fresh and aged $La_XMnO_Y$ perovskite oxide particle samples was the linewidth (ΔH)—a measurement of the magnetic induction difference (in gauss) between the maximum and minimum intensity values of the spectra as shown in the lowermost plot for $La_{0.9}MnO_Y$—generally decreased with a decrease in the molar ratio of lanthanum to manganese ("X"). Such data suggests the $Mn^{4+}$ content in the manganese constituency of the $La_XMnO_Y$ perovskite oxide samples was inversely related to the molar ratio of lanthanum to manganese ("X") consistent with the previously-described XRD, XPS, and redox titration data.

Figure 9:
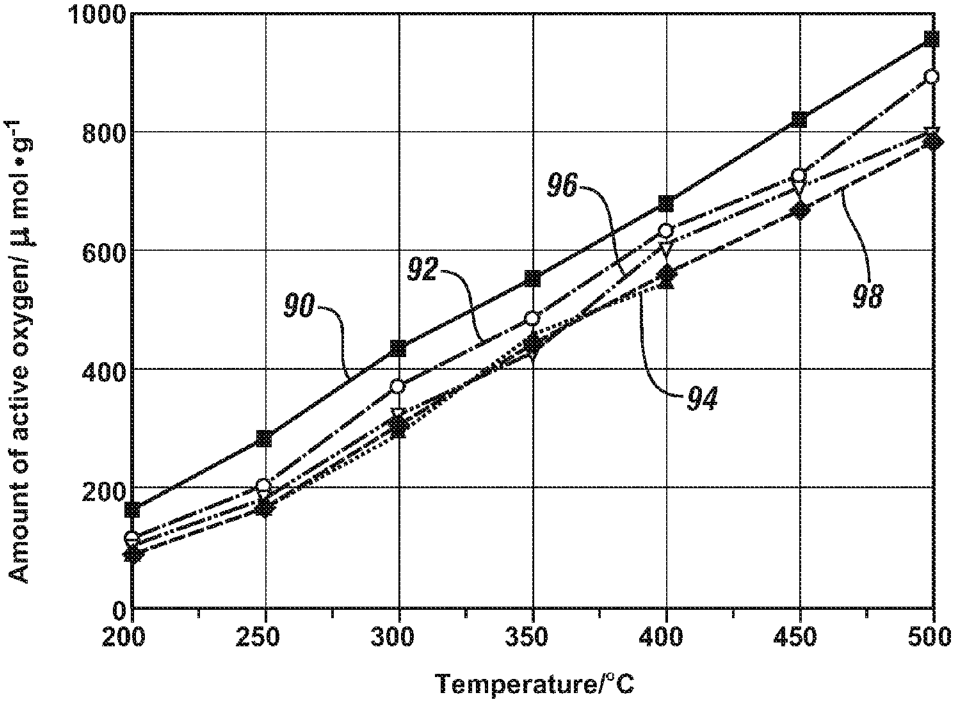
FIG. 9 is a graph that shows the amount of active oxygen available per unit mass (μmol/g) for particle samples of fresh $La_{0.9}MnO_Y$ perovskite oxide, fresh $La_{0.95}MnO_Y$ perovskite oxide, fresh $LaMnO_Y$ perovskite oxide, fresh $La_{1.05}MnO_Y$ perovskite oxide, and fresh $La_{1.11}MnO_Y$ perovskite oxide. The amount of active oxygen available was obtained using CO—$O_2$ pulse equipment in which a CO stream (4 vol. % CO, 1 vol. % Ar, balance He) and an $O_2$ stream (2 vol. % $O_2$, 1 vol. % Ar, balance He) were alternately pulsed over the samples (diluted with quartz).
Figure 10:
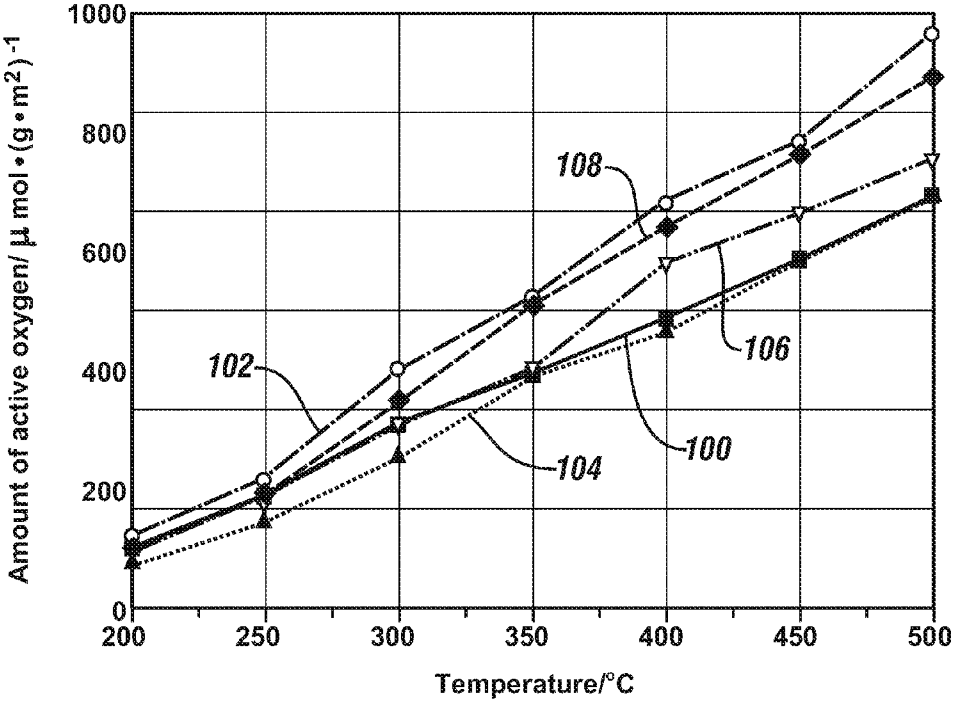
FIG. 10 is a graph that shows the amount of active oxygen measured in FIG. 9 when normalized on a per surface area basis (μmol/g·$m^2$).

The amount of active oxygen present in the fresh $La_XMnO_Y$ perovskite oxide particle samples is shown in FIGS. 9 and 10. FIG. 9 shows the amount of active oxygen per unit mass (μmol/g) and FIG. 10 shows the amount of active oxygen after being normalized on a per surface area basis (μmol/g·m$^2$). Active oxygen is oxygen contained in the $La_XMnO_Y$ perovskite oxide that can be made available as a free radical oxygen species to perform an oxidizing function. This value can be indicative of the $La_XMnO_Y$ perovskite oxide's oxidizing power. The active oxygen results shown in FIGS. 9 and 10 were derived from CO—$O_2$ pulse equipment with a system having a dead volume of 3.5 ml. For each sample, about 25 mg of the fresh $La_XMnO_Y$ perovskite oxide particles were diluted with 40 mg of quartz beads and placed at the bottom of a heat transfer reactor. A CO stream (4 vol. % CO, 1 vol. % Ar, and the balance He) and an $O_2$ stream (2 vol. % $O_2$, 1 vol. % Ar, and the balance He), each supplied at about 300 ml/min, were alternately pulsed over the quartz-diluted $La_XMnO_Y$ perovskite oxide particles at a pulsation frequency of 0.05 Hz (i.e., 10 second cycles for each stream). The concentrations of CO, $CO_2$, $O_2$, Ar, and He in the outlet stream leaving the reactor were monitored online by a Balzers QMS200 quadrupole spectrometer. The amount of $CO_2$ contained in the outlet stream was used to determine the active oxygen content. A dynamic CO—$O_2$ pulse value was obtained by integrating the $CO_2$ formed during each CO—$O_2$ cycle and was expressed as μmol of active oxygen per gram of the $La_XMnO_Y$ perovskite oxide particles contained in the reactor. The dynamic measurements were obtained and plotted at 50° C. intervals over the temperature range of 200° C. to 500° C. to produce FIG. 9. The data provided in FIG. 9 was then normalized on a per surface area basis to produce FIG. 10.

The $La_XMnO_Y$ perovskite oxide particle samples are identified in FIGS. 9 and 10 as shown below in Table 5.

TABLE 5

Reference Numerals for FIGS. 9 and 10

| Sample | Reference Numeral FIG. 9 | Reference Numeral FIG. 10 |
|---|---|---|
| $La_{0.9}MnO_{3+\delta}$ | 90 | 100 |
| $La_{0.95}MnO_{3+\delta}$ | 92 | 102 |
| $LaMnO_{3+\delta}$ | 94 | 104 |
| $La_{1.05}MnO_{3+\delta}$ | 96 | 106 |
| $La_{1.11}MnO_{3+\delta}$ | 98 | 108 |

As shown in FIG. 9, more active oxygen was present in the fresh $La_{0.9}MnO_{3+\delta}$ and $La_{0.95}MnO_{3+\delta}$ perovskite oxide particles samples over the temperature range of 200° C. to 350° C. than the other three samples. Specifically, the order of active oxygen content was $La_{0.9}MnO_{3+\delta}$>$La_{0.95}MnO_{3+\delta}$>$LaMnO_{3+\delta}$≈$La_{1.05}MnO_{3+\delta}$≈$La_{1.11}MnO_{3+\delta}$. After normalization on a per surface are basis, as shown in FIG. 10, the active oxygen content of the $La_{0.95}MnO_{3+\delta}$ sample was the largest. It appears the availability of active oxygen increases with a decreasing molar ratio of lanthanum to manganese ("X") in the $La_XMnO_Y$ perovskite oxide particle samples. The active oxygen content is believed to be related to the $Mn^{4+}$ concentration of the total manganese in the $La_XMnO_Y$ perovskite oxide samples. And, as previously indicated, the $Mn^{4+}$ content generally increases with a decreasing molar ratio of lanthanum to manganese ("X") in the $La_XMnO_Y$ perovskite oxide samples.

Figure 11:
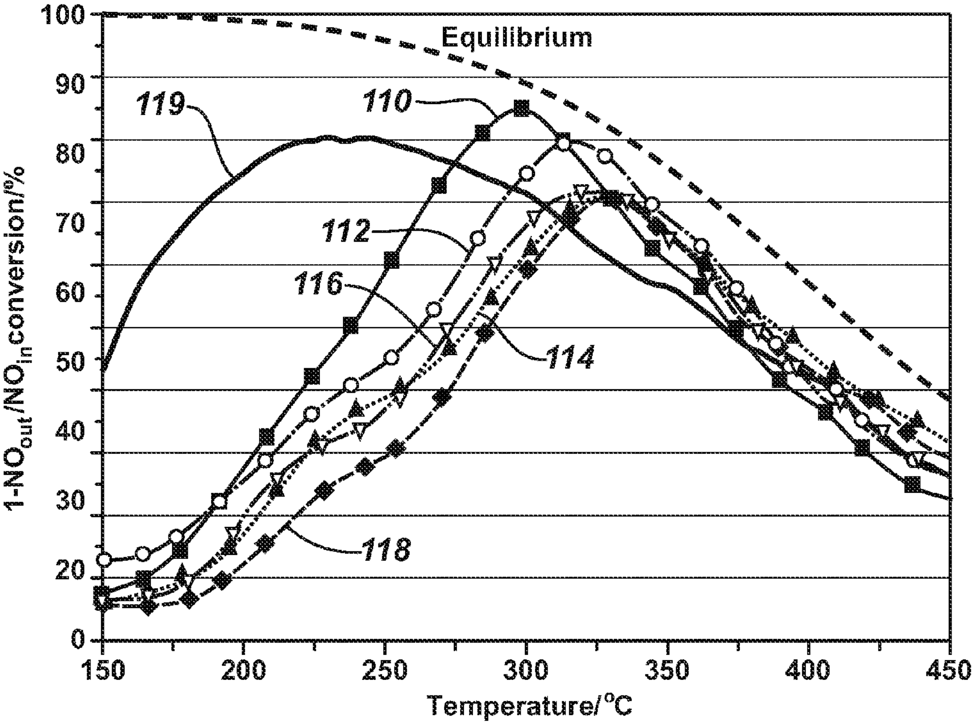
FIG. 11 is graph that compares the NO to $NO_2$ oxidative activity of particle samples of fresh $La_{0.9}MnO_Y$ perovskite oxide, fresh $La_{0.95}MnO_Y$ perovskite oxide, fresh $LaMnO_Y$ perovskite oxide, fresh $La_{1.05}MnO_Y$ perovskite oxide, fresh $La_{1.11}MnO_Y$ perovskite oxide, and a fresh benchmark $Pt/Al_2O_3$ catalyst material. Each of the six samples was diluted with quartz and placed in the middle of the tube reactor between two clogs of quartz wool, and then exposed to a gas flow, at a gas hourly space velocity of 30,000 $h^{-1}$, that comprised 10 vol. % $O_2$, 5 vol. % $H_2O$, 5 vol. % $CO_2$, 100 ppm NO, and the balance $N_2$. The temperature of the gas flow was increased by 10° C. per minute from 100° C. to 450° C. The conversion of NO to $NO_2$ for each fresh sample was determined by comparing the the amount of NO contained in the gas flow entering the reactor and the amount of NO contained in the effluent flow leaving the reactor.
Figure 12:
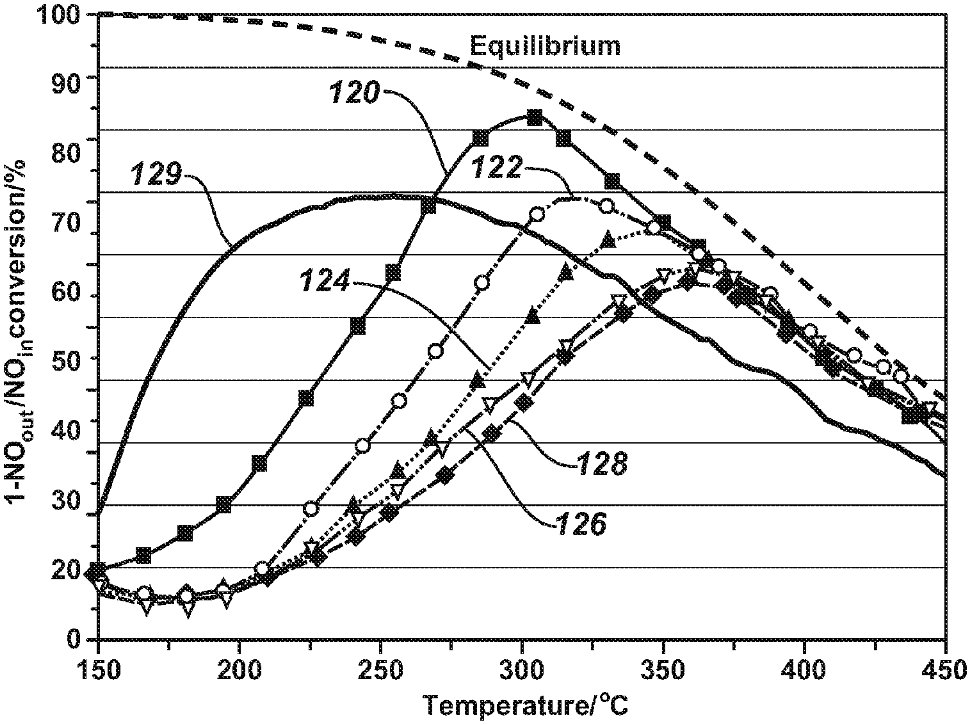
FIG. 12 is graph that compares the NO to $NO_2$ oxidation activity of particle samples of aged $La_{0.9}MnO_Y$ perovskite oxide, aged $La_{0.95}MnO_Y$ perovskite oxide, aged $LaMnO_Y$ perovskite oxide, aged $La_{1.05}MnO_Y$ perovskite oxide, aged $La_{1.11}MnO_Y$ perovskite oxide, and an aged benchmark $Pt/Al_2O_3$ catalyst material. The conversion of NO to $NO_2$ for each aged sample was determined by the same technique used with the fresh samples (FIG. 11).

Finally, the NO oxidation of each of the five $La_XMnO_Y$ perovskite oxide particle samples and a benchmark $Pt/Al_2O_3$ conventional catalyst material sample were analyzed in their fresh and aged states, as shown in FIGS. 11 and 12. The benchmark $Pt/Al_2O_3$ catalyst material was aged similarly to the $La_XMnO_Y$ perovskite oxide samples. To test for NO oxidative activity, each sample was diluted with quartz at a ratio of 1:9 ($La_XMnO_Y$ perovskite oxide particles to quartz) and placed in the middle of the tube reactor (diameter=6 mm, length=36 mm) between two clogs of quartz wool. The samples were then pretreated for one hour at 500° C. with a gas flow that comprised 10 vol. % $O_2$ in $N_2$ at a flow rate of 850 ml/min and a gas hourly space velocity of 30,000 $h^{-1}$. Afterwards, the samples were cooled to around 100° C. at which time the gas flow, still at 850 ml/min and a gas hourly space velocity of 30,000 $h^{-1}$, was switched to 10 vol. % $O_2$, 5 vol. % $H_2O$, 5 vol. % $CO_2$, 100 ppm NO, and the balance $N_2$. The temperature of the gas flow was increased by 10° C. per minute from 100° C. to 450° C. A Fourier Transform Infrared analyzer (Nicolet 380) equipped with a high sensitivity MCT detector was used to continuously analyze the composition of the effluent exiting the reactor after passing through the quartz-diluted $La_XMnO_Y$ perovskite oxide particle samples. The NO to $NO_2$ oxidative conversion activity of each sample was determined by dividing the amount of NO contained in the effluent leaving the reactor by the amount of NO introduced into the reactor.

The amount of NO converted to $NO_2$ (%) for each particle sample (including the benchmark $Pt/Al_2O_3$ catalyst material sample) as a function of average catalyst temperature (° C.) is shown in FIGS. 11 and 12. FIG. 11 depicts the NO oxidative activity of the fresh particle samples and FIG. 12 depicts the NO oxidative activity of the aged particle samples. The $La_XMnO_Y$ perovskite oxide samples and the benchmark $Pt/Al_2O_3$ sample are identified in FIGS. 11 and 12 as shown below in Table 6.

TABLE 6

Reference Numerals for FIGS. 11 and 12

| Sample | Reference Numeral FIG. 11 | Reference Numeral FIG. 12 |
|---|---|---|
| $La_{0.9}MnO_{3+\delta}$ | 110 | 120 |
| $La_{0.95}MnO_{3+\delta}$ | 112 | 122 |
| $LaMnO_{3+\delta}$ | 114 | 124 |
| $La_{1.05}MnO_{3+\delta}$ | 116 | 126 |
| $La_{1.11}MnO_{3+\delta}$ | 118 | 128 |
| $Pt/Al_2O_3$ | 119 | 129 |

As can be seen, the fresh $La_{0.9}MnO_{3+\delta}$ and $La_{0.95}MnO_{3+\delta}$ samples (numerals 110 and 112 in FIG. 11) oxidized NO to $NO_2$ more effectively than the $LaMnO_{3+\delta}$, $La_{1.05}MnO_{3+\delta}$, and $La_{1.11}MnO_{3+\delta}$ particle samples over the temperature range of 200° C. to 325° C. The fresh $La_{0.9}MnO_{3+\delta}$ sample even reached a maximum NO conversion (85% around 290° C.-300° C.) that eclipsed the maximum NO conversion achieved by the benchmark $Pt/Al_2O_3$ sample (80% around 225° C.). With respect to the aged samples, the $La_{0.9}MnO_{3+\delta}$ and $La_{0.95}MnO_{3+\delta}$ perovskite oxide particles samples (numerals 120 and 122 in FIG. 12) retained superior NO oxidation activities when compared to the other three perovskite oxide samples over the temperature range of 200° C. to 325° C. In fact, the aging treatment hardly affected the NO oxidative activity of the $La_{0.9}MnO_{3+\delta}$ sample (compare 110 in FIG. 11 with 120 in FIG. 12). The $La_{0.9}MnO_{3+\delta}$ sample maintained its maximum NO conversion above 80% while every other sample, including the benchmark $Pt/Al_2O_3$ sample, fell more appreciably.

The above description of exemplary embodiments and specific examples are merely descriptive in nature and not intended to limit the scope of the claims that follow.

The invention claimed is:

1. A method of oxidizing NO to $NO_2$ in an exhaust aftertreatment system for a hydrocarbon-fueled engine, the method comprising:

(a) supplying a mixture of air and fuel to a hydrocarbon-fueled engine, the mixture of air and fuel being defined by an air to fuel mass ratio that is lean of stoichiometry;

(b) combusting the mixture of air and fuel in the hydrocarbon-fueled engine to produce an exhaust flow that contains a $NO_X$ content, the $NO_X$ content including NO and $NO_2$ at a $NO:NO_2$ molar ratio; and (c) exposing the exhaust flow to an oxidation catalyst with a NO to $NO_2$ oxidative activity sufficient to reduce the $NO:NO_2$ molar ratio of the $NO_X$ content of the exhaust flow, the oxidation catalyst being particles of a non-stoichiometric perovskite oxide having the formula $La_XMnO_Y$ in which X ranges from 0.85 to 0.95 and Y ranges from 3.0 to 3.30, the non-stoichiometric $La_XMnO_Y$ perovskite oxide particles having a diameter that ranges from 10 nm to 100 μm and being present at a loading of 5 grams to 200 grams per liter of flow volume over to the non-stiochiometric perovskite oxide particles.

2. The method of claim 1, wherein the oxidation catalyst is particles of the non-stoichiometric perovskite oxide having the formula $La_{0.95}MnO_Y$ in which Y ranges from 3.0 to 3.30.

3. The method of claim 1, wherein the oxidation catalyst is particles of the non-stoichiometric perovskite oxide having the formula $La_{0.90}MnO_Y$ in which Y ranges from 3.0 to 3.30.

4. The method of claim 1, wherein step (c) comprises:

supplying the exhaust flow to a monolithic honeycomb support structure that includes a front end, a rear end, and a plurality of isolated channels that extend from the front end to the rear end, each of the isolated channels being defined by an interior wall surface over which the non-stoichiometric perovskite oxide particles are deposited; and passing the exhaust flow through the isolated channels from the front end to the rear end to expose a plurality of segregated portions of the exhaust flow to the non-stoichiometric perovskite oxide particles deposited within the plurality of isolated channels.

5. The method of claim 1, further comprising:

(d) exposing the exhaust flow to at least one other catalyst that is different from the non-stoichiometric perovskite oxide, the at least one other catalyst being particles, which have a diameter that ranges from about 10 nm to about 100 μm, of a platinum group metal, an alkali or alkaline earth metal oxide, an alkali or alkaline earth metal carbonate, a base metal ion-substituted zeolite, a base metal ion-substituted silicoaluminophosphate, or a mixture thereof.

6. The method of claim 5, wherein step (d) comprises at least one of:

exposing the exhaust flow to palladium particles that are present at a loading of 0.10 grams to 3.5 grams per liter of flow volume over the palladium particles, and the non-stoichiometric perovskite oxide particles being present at a loading of 50 to 150 grams per liter of flow volume over the non-stoichiometric perovskite oxide particles;

exposing the exhaust flow to alkali or alkaline earth metal oxide particles or alkali or alkaline earth metal carbonate particles, or a mixture thereof, and rhodium particles, the alkali or alkaline earth metal oxide particles and/or the alkali or alkaline earth metal carbonate particles being present at a loading of 10 grams to 50 grams per liter of flow volume over the alkali or alkaline earth metal oxide particles and/or the alkali or alkaline earth metal carbonate particles, the rhodium particles being present at a loading of 0.05 grams to about 0.50 grams per liter of flow volume over the rhodium particles, and the non-stoichiometric perovskite oxide particles being present at a loading of 100 to 150 grams per liter of flow volume over the non-stoichiometric perovskite oxide particles; or exposing the exhaust flow to base metal ion-substituted zeolite particles or base metal ion-substituted silicoaluminophosphate particles, or a mixture thereof, the base metal ion-substituted zeolite particles and/or the base metal ion-substituted silicoaluminophosphate particles being present at a loading of 100 grams to 180 grams per liter of flow volume over the base metal ion-substituted zeolite particles and/or the base metal ion-substituted silicoaluminophosphate particles, and the non-stoichiometric perovskite oxide particles being present at a loading of 5 to 75 grams per liter of flow volume over the non-stoichiometric perovskite oxide particles.

7. The method of claim 1, wherein the hydrocarbon-fueled engine is a multi-cylinder, reciprocating, internal combustion engine selected from the group consisting of a charge-compression engine, a spark-ignition direct injection engine, or a homogeneous charge-compression engine.

8. A catalyzed flow-through component for inclusion in an exhaust aftertreatment system, the component comprising:

a flow-through monolithic support structure that includes a front end, a rear end, and a plurality of isolated channels that extend from the front end to the rear end, the flow-through monolithic support structure being configured so that an exhaust flow produced by combustion of a mixture of air and fuel that is lean of stoichiometry is received at the front end and passed through the isolated channels to the rear end where the exhaust flow is discharged from the flow-through monolithic support structure; and an oxidation catalyst deposited in the isolated channels that oxidizes NO contained in the exhaust flow to $NO_2$, the oxidation catalyst being particles of a non-stoichiometric perovskite oxide having the formula $La_XMnO_Y$ in which X ranges from 0.85 to 0.95 and Y ranges from 3.0 to 3.30, the non-stoichiometric perovskite oxide particles being present in the isolated channels at a loading of 5 grams to 200 grams per liter of flow volume over the non-stiochiometric perovskite oxide particles.

9. The catalyzed flow-through component of claim 8, wherein the oxidation catalyst is particles of the non-stoichiometric perovskite oxide having the formula $La_{0.95}MnO_Y$ in which Y ranges from 3.0 to 3.30.

10. The catalyzed flow-through component of claim 8, wherein the oxidation catalyst is particles of the non-stoichiometric perovskite oxide having the formula $La_{0.90}MnO_Y$ in which Y ranges from 3.0 to 3.30.

11. The catalyzed flow-through component of claim 8, wherein the non-stoichiometric perovskite oxide particles have a diameter that ranges from 10 nm to 100 μm.

12. The catalyzed flow-through component of claim 8, wherein the flow-through monolithic support structure is constructed from a ceramic or a heat and corrosion resistant metal.

13. The catalyzed flow-through component of claim 8, further comprising:

at least one other catalyst deposited in the isolated channels that is different from the non-stoichiometric perovskite oxide, the other catalyst being particles, which have a diameter that ranges from 10 nm to 100 μm, of a platinum group metal, an alkali or alkaline earth metal oxide, an alkali or alkaline earth metal carbonate, a base metal ion-substituted zeolite, a base metal ion-substituted silicoaluminophosphate, or a mixture thereof.

14. The catalyzed flow-through component of claim 13, wherein palladium particles are deposited in the isolated channels of the flow-through monolithic support structure with the non-stoichiometric perovskite oxide particles, the palladium particles being present at a loading of 0.10 to 3.5 grams per liter of flow volume over the palladium particles and the non-stoichiometric perovskite oxide particles being present at a loading of 50 to 150 grams per liter of flow volume over the non-stoichiometric perovskite oxide particles.

15. The catalyzed flow-through component of claim 13, wherein alkali or alkaline earth metal oxide particles or alkali or alkaline earth metal carbonate particles, or a mixture thereof, and rhodium particles are deposited in the isolated channels of the flow-through monolithic support structure with the non-stoichiometric perovskite oxide particles, the alkali or alkaline earth metal oxide particles and/or the alkali or alkaline earth metal carbonate particles being present at a loading of 10 grams to 50 grams per liter of flow volume over the alkali or alkaline earth metal oxide particles and/or the alkali or alkaline earth metal carbonate particles, the rhodium particles being present at a loading of 0.05 grams to about 0.50 grams per liter of flow volume over the rhodium particles, and the non-stoichiometric perovskite oxide particles being present at a loading of 100 to 150 grams per liter of flow volume over the non-stoichiometric perovskite oxide particles.

16. The catalyzed flow-through component of claim 13, wherein base metal ion-substituted zeolite particles or base metal ion-substituted silicoaluminophosphate particles, or a mixture thereof, are deposited in the isolated channels of the flow-through monolithic support structure with the non-stoichiometric perovskite oxide particles, the base metal ion-substituted zeolite particles and/or the base metal ion-substituted silicoaluminophosphate particles being present at a loading of 100 grams to 180 grams per liter of flow volume over the base metal ion-substituted zeolite particles and/or the base metal ion-substituted silicoaluminophosphate particles, and the non-stoichiometric perovskite oxide particles being present at a loading of 5 to 75 grams per liter of flow volume over the non-stoichiometric perovskite oxide particles.

17. The catalyzed flow-through component of claim 8, further comprising:

a base metal oxide or a mixed metal oxide deposited in the isolated channels of the flow-through monolithic support structure, as particles which have a diameter that ranges from about 10 nm to about 100 μm, with the non-stoichiometric perovskite oxide particles, the base metal oxide and/or the mixed metal oxide particles being present at a loading of 30 grams to 300 grams per liter of flow volume over the base metal oxide and/or mixed metal oxide particles, and the non-stoichiometric perovskite oxide particles being present at a loading of 50 to 200 grams per liter of flow volume over the non-stoichiometric perovskite oxide particles.

18. The catalyzed flow-through component of claim 17, wherein the base metal oxide or mixed metal oxide is $Al_2O_3$, $CeO_2$, $CeO_2$—$ZrO_2$, CuO—$CeO_2$, $Pr_6O_{11}$, $Pr_6O_{11}$—$CeO_2$, or a mixture thereof.

* * * * *